United States Patent [19]
Foerster et al.

[11] 4,039,801
[45] Aug. 2, 1977

[54] METHOD FOR CONNECTING A FINE WIRE TO A CONNECTING PIN

[75] Inventors: Otto Foerster, Graefelfing; Erich Vojta, Munich, both of Germany

[73] Assignee: Siemens Aktiengesellschaft, Berlin & Munich, Germany

[21] Appl. No.: 591,038

[22] Filed: June 27, 1975

Related U.S. Application Data

[63] Continuation of Ser. No. 429,561, Jan. 2, 1974, abandoned.

[30] Foreign Application Priority Data

Jan. 10, 1973 Germany .............................. 2301094

[51] Int. Cl.² .............................................. B23K 9/00
[52] U.S. Cl. .............................................. 219/137 R
[58] Field of Search ................ 219/137, 136, 129, 74, 219/75; 29/628

[56] References Cited

U.S. PATENT DOCUMENTS

| 3,649,811 | 3/1972 | Schoenthaler | 219/85 X |
| 3,673,681 | 7/1972 | Steranko | 219/85 X |

FOREIGN PATENT DOCUMENTS

| 71/7990 | 12/1972 | South Africa | 219/129 |

OTHER PUBLICATIONS

"Tungsten Arc Welded", The Welding Engineer, Dec. 1948, pp. 60 & 62, by Clyde B. Clason.
IBM Technical Disclosure, "Butt Brazing Apparatus and Method", vol. 15, No. 10, Mar. 1973, p. 3297.

Primary Examiner—J. V. Truhe
Assistant Examiner—Fred E. Bell
Attorney, Agent, or Firm—Hill, Gross, Simpson, Van Santen, Steadman, Chiara & Simpson

[57] ABSTRACT

A fine insulated wire with a diameter of less than 0.3 mm is attached to a connecting pin embedded in an electric component. The wire is wrapped around this connecting pin at least three times, and then argon-arc welded without melting the electrode. This welding operation is carried out from a distance of less than 3 mm and preferably on the order of 0.5 mm, for a short time such as for a period of less than 0.75 seconds, preferably on the order of 0.5 seconds. In order to avoid heating the wire is far above its melting point, which might destroy the wire or cause similar disadvantages, the connection pin is pre-tinned, the tin is rendered molten and the insulating coating of the wire is partially burned during the welding process in such a way that the solidified tin will hold the wire at several points.

2 Claims, 3 Drawing Figures

METHOD FOR CONNECTING A FINE WIRE TO A CONNECTING PIN

This is a continuation of application Ser. No. 429,561, filed Jan. 2, 1974 now abandoned.

BACKGROUND OF THE INVENTION

It is often required to connect the connecting pins of an electric component, such as a relay coil, to a fine insulated wire of less than 0.3 mm diameter. According to the prior art, this is done in such a way that the wire is wrapped at least three times around the free end of the connecting pin and is then argon-arc welded without melting the electrode, for a short time such as for a period of less than 0.75 seconds, preferably on the order of 0.5 seconds. Thereby, the wire forms a bead with the free end of the connection pin.

This prior art method has not proven entirely satisfactory since the wire winding may not be sufficiently affixed after the welding process but can be easily shifted, for instance if the component is mechanically stressed. The wire may be broken off or torn, especially in the area of the weld bead.

In addition, it is possible that a winding is destroyed by overheating. Especially if the wire is very thin, for instance of a diameter of less than 0.1 mm, it may be easily heated far above its melting point during the arc-welding process. Furthermore, the material can become hard or brittle since the material construction may change due to the heat during the welding process. Such a change of the material construction may break or tear the connection wire, especially in the area adjacent to the welding connection.

SUMMARY OF THE INVENTION

The invention improves on the older method of argon-arc welding a fine wire to a connecting pin, in that even very fine wires can be welded by this method. According to this invention, the wire is wrapped around a pre-tinned connecting pin, and the welding heat which is used to form the weld bead between the wire and pin, is used to melt the tin upon the connecting pin and to partially burn the insulation layer so that the tin holds the wrapped wire at least at a few points, after it has cooled down.

DESCRIPTION OF A PREFERRED METHOD

Figure 1:
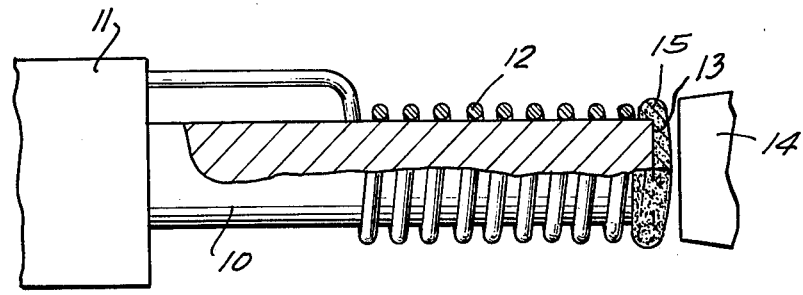
FIG. 1 is a partial cross-sectional view of a welded joint of a wrapped wire to a pin in accordance with the prior art.
Figure 2:
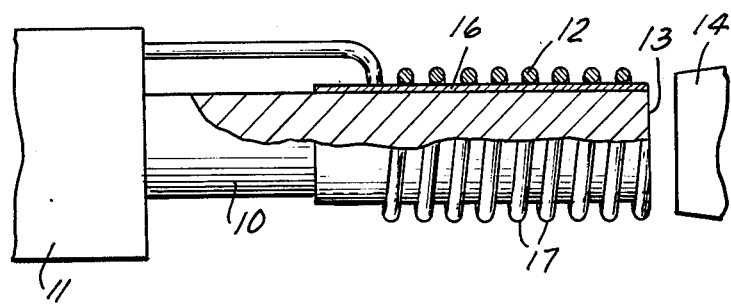
FIG. 2 is a partial cross-sectional view illustrating a pin with a tin coating with wire wrapped thereon prior to applying heat from a welding electrode.
Figure 3:
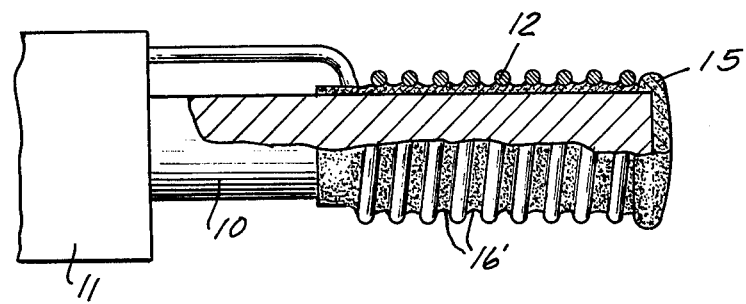
FIG. 3 is a partial cross-sectional view of the joint produced by the method of the present invention.

In the prior art method (FIG. 1), a connecting pin 10 of an electrical component 11, such as a relay coil, was connected to a fine insulated wire 12 in the following manner. The wire 12 was wrapped around the pin at least three times at the free end 13 of the pin 10 and then was argon welded by an electrode 14 so that the wire 11 forms a bead 15 with the free end of the connecting pin 10.

According to a preferred embodiment of this invention, a connecting pin 10 of a diameter in the order of .6 mm is provided with a tin coating 16 before it is embedded in an electric component 11, preferably a relay coil. A fine insulated wire 12 of less than .3 mm diameter is wrapped around this pre-tinned connecting pin 10 at least three times, whereby the windings 17 are positioned adjacent to the free end of the connecting pin, on approximately 1 mm length of the connecting pin.

During an argon-arc welding process in an inert-gas atmosphere to produce the bead 15, which process is carried out for a maximum of a given period of less than 0.75 seconds, preferably in the order of 0.5 seconds, the tin upon the connecting pin is melted by the heat radiation from the arc welder 14 and also by the heat conduction within the connecting pin material and the insulation layer on the wire in the area of the winding is burned entirely or partially in such a way that, after cooling and re-solidifying, the tin 16 will hold the wire wrapping 17 at several places.

The wire 12 must merely be held at a few points of the connecting pin by the solidified solder or tin 16. These points do not serve as electric contacts between the wire and the connecting pin, and it is thus not important whether parts of the insulation have been embedded in the tin or if the tin covers the wire only partially. It is a surprising effect that a very good heat bridge is formed between the pin and the wire during the above described welding process.

The method according to this invention is usually used in a tungsten inert-gas welding process, but can also be used in a plasma arc jet welding process, in an inert-gas atmosphere. It is merely necessary to supply an exactly determined amount of heat to the welding point as well as to provide an inert-gas atmosphere. It will be apparent from the above description of the preferred embodiment that this invention provides a simple, practical and effective method for welding a very fine wire to a connecting pin of an electric component and, although there may be variations and modifications made by those skilled in the art, it is our desire to include these variations and modifications within the scope of our invention as defined in the appended claims.

We claim:

1. A method of forming a welded connection between a fine wire having a layer of insulation and a connecting pin comprising the steps of applying a layer of solder on the pin, then wrapping the wire around the pin with at least three turns of the wire extending around the pin, applying a welding arc to weld a portion of the wrapped wire to the pin with a weld bead adjacent to the end of the pin, said welding arc burning the insulation layer from the wire in the area of the turns and also melting the layer of solder which then solidifies to hold the wrapped wire on the pin in at least one place spaced from the weld bead to prevent shifting of the unwelded portion of the wire on the pin and prevent breaking of the wire at the weld bead.

2. A method according to claim 1, which includes the step of embedding the pin having a layer of tin in an electrical component prior to applying the welding arc.

* * * * *